(12) United States Patent
Kaus et al.

(10) Patent No.: US 8,094,895 B2
(45) Date of Patent: Jan. 10, 2012

(54) POINT SUBSELECTION FOR FAST DEFORMABLE POINT-BASED IMAGING

(75) Inventors: Michael Kaus, Toronto (CA); Todd McNutt, Severna Park, MD (US); Vladimir Pekar, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1066 days.

(21) Appl. No.: 11/915,752

(22) PCT Filed: May 31, 2006

(86) PCT No.: PCT/IB2006/051739
§ 371 (c)(1),
(2), (4) Date: Nov. 28, 2007

(87) PCT Pub. No.: WO2006/131848
PCT Pub. Date: Dec. 14, 2006

(65) Prior Publication Data
US 2009/0279739 A1    Nov. 12, 2009

Related U.S. Application Data

(60) Provisional application No. 60/595,122, filed on Jun. 8, 2005.

(51) Int. Cl.
*G06K 9/00* (2006.01)
*G06K 9/62* (2006.01)
*G06K 9/32* (2006.01)

(52) U.S. Cl. ........ 382/128; 382/131; 382/132; 382/173; 382/181; 382/209; 382/215; 382/294

(58) Field of Classification Search .................. 382/128, 382/131, 132, 173, 181, 209, 245, 294
See application file for complete search history.

(56) References Cited

U.S. PATENT DOCUMENTS

| | | | | |
|---|---|---|---|---|
| 5,689,577 A * | 11/1997 | Arata | ............................. | 382/128 |
| 5,886,702 A | 3/1999 | Migdal et al. | | |
| 6,106,466 A | 8/2000 | Sheehan et al. | | |
| 6,301,496 B1 * | 10/2001 | Reisfeld | ......................... | 600/407 |
| 6,633,686 B1 * | 10/2003 | Bakircioglu et al. | ......... | 382/294 |
| 6,937,751 B2 * | 8/2005 | Ritt et al. | ....................... | 382/132 |
| 7,027,624 B2 * | 4/2006 | Monden | ......................... | 382/124 |
| 7,043,062 B2 * | 5/2006 | Gerard et al. | ................. | 382/128 |
| 7,379,598 B2 * | 5/2008 | Maurer | ......................... | 382/209 |

OTHER PUBLICATIONS

Kefalea, et al. "Object Classification Based on Contours with Elastic Graph Matching." Proceedings of the IWVF3. (1997): 1-11. Print.*

(Continued)

*Primary Examiner* — Michael A Newman

(57) ABSTRACT

A method for selecting vertices for performing deformable registration of imaged objects is provided. The selected vertices form corresponding pairs, each pair including a vertex from a first imaged object and a vertex from a second imaged object. The corresponding vertex pairs are sorted in order of distance between the vertices making up the corresponding vertex pair. The corresponding vertex pair with the greatest distance is given top priority. Corresponding vertex pairs that lie within a selected distance from the selected corresponding vertex pair are discarded. In this manner, the number of vertex pairs used for deformable registration of the imaged objects is reduced and therefore allows for processing times that are clinically acceptable.

20 Claims, 3 Drawing Sheets

OTHER PUBLICATIONS

Wang, et al. "A Divide and Conquer Deformable Contour Method with a Model Based Searching Algorithm." IEEE Transactions on Systems, Man, And Cybernetics. 33.5 (2003): 738-751. Print.*
Murthy, Narayan. "Min-Max Sort : A Simple Sorting Method." CSC '87 Proceedings of the 15th annual conference on Computer Science . (1987): 365. Print.*
Pulli K; Multiview Registration for Large Data Sets; 3-D Digital Imaging and Modeling; 1999 IEEE; pp. 160-168.
Zhengyou Zhang; Interative Point Matching for Registration of Free-Form Curves and Surfaces; International Journal of Computer Visions; 1994; vol. 13, No. 2, pp. 119-152.
Rusinkiewicz S , et al.; Efficient Variants of the ICP Algorithm; 3-D Digital Imaging and Modeling; 2001 IEEE; pp. 145-152.
Chen Y et al; Object Modelling by Registration of Multiple Range Images; Image and Vision Computing; 1991, vol. 10, No. 3, pp. 145-155.

* cited by examiner

POINT SUBSELECTION FOR FAST DEFORMABLE POINT-BASED IMAGING

CROSS REFERENCE TO RELATED APPLICATIONS

This application claims the benefit of U.S. provisional application Ser. No. 60/595,122 filed Jun. 8, 2005, which is incorporated herein by reference.

Radiotherapy is the treatment of diseases, such as cancer tumors, with radiation, such as X-ray radiation. In the course of administering radiation to the diseased tissue, some healthy tissue is also exposed to the radiation. Exposure of healthy tissue to radiation can cause treatment related complications. As such, it is desirable to accurately and precisely contour the diseased region so that the radiation is applied predominately to the diseased tissue and minimally to the surrounding healthy tissue.

An accurate and precise contour of the treated region (the planning target volume or PTV) incorporates the motion of the target during fractionated treatment. Motion can be physical movement of the patient (setup error) or movement and deformation of the internal tissues, including the diseased tissue, caused by physiological functions, such as cardiac, respiratory, and digestive systems, or as a result of treatment response. In conventional treatment planning, the PTV is based on statistics of patient populations, resulting in too large or inaccurate target areas. In order to assess patient-specific motion, a series of images is taken over a period of time to get a 3D description of the geometric change of the diseased tissue and surrounding organs. The temporal sampling can be seconds to monitor e.g. breathing motion using 4D gated imaging, or days and weeks, or combinations of these such as weekly imaging using a 4D gated imaging technique. Integrating time-samples of 3D images in radiotherapy is generally termed image-guided radiotherapy (IGRT) or adaptive radiotherapy. Such adjustment allows for application of radiation to a more precise target region.

Quantitative measurement of the deformation processes taking place during the treatment is necessary for many applications in IGRT. The dose volume histogram (DVH) is an important means to assess the treatment quality, statistically describing the dose distribution in the target area and the risk organs. The DVH is conventionally based on a single 3D image. To accumulate a four-dimensional dose histogram, the spatial correspondence between the volume elements of the target region and the surrounding organs needs to be calculated in all images. This can be done by deformable registration. Due to changes caused by movement and mass movement, such as bowel gas and stool, voxel-based registration methods are typically ineffective as it is too difficult to match corresponding points in the images. Alternatively, registration methods based on geometric correspondences (e.g. between points or surfaces) can be used. Model-based segmentation methods have been successfully used to segment structures in the region of interest by automatically deforming a triangular surface mesh to the surface of the object of interest. If this technique is applied to all structures in all images, the vertices of the adapted meshes define corresponding landmarks between a reference object surface and the imaged object surface. The landmarks are aligned and a deformation field for all voxels in the image can be estimated with deformable point-based registration methods, resulting in a volumetric deformation field describing the movement of each voxel in the image.

Deformable models are capable of accommodating the significant variability of biological structures, however such models are complex. Typically, the amount of vertices defined for an anatomical object is in the thousands. To compute volumetric deformation fields using point-based registration techniques based on thousands of vertices or landmarks requires significant processing time, which is not feasible in a clinical setting. As such, there exists a need for a deformation procedure that can provide an estimated volumetric deformation for an anatomical object within a clinically acceptable time period.

The present invention is directed to a deformation model for generating a volumetric image object within a clinically acceptable time period. The deformation model systematically selects a reduced number of vertices to be used in the deformable registration. The reduced number of vertices used allows for acceptable processing time. The systematic selection of vertices to be used provides for distribution of the selected vertices across the entire surface of the imaged object and reduces topographical errors caused by proximate vertices.

In one embodiment, a method is provided to reduce the number of corresponding vertex pairs based on a select distance. The method sorts the corresponding vertex pairs in descending order based on the distance between the vertices of the vertex pairs. The corresponding vertex pair with the greatest distance is given top priority. Corresponding vertex pairs that lie within a selected distance are discarded, thereby reducing the number of corresponding vertex pairs used in the deformable registration. In some embodiments, the selected distance is the distance between vertices of the selected corresponding vertex pair. In other embodiments, the selected distance is predetermined. In some embodiments, the distance can be varied.

In the accompanying drawings, which are incorporated in and constitute a part of this specification, embodiments of the invention are illustrated, which, together with a general description of the invention given above, and the detailed description given below serve to illustrate the principles of this invention. One skilled in the art should realize that these illustrative embodiments are not meant to limit the invention, but merely provide examples incorporating the principles of the invention.

The deformation model disclosed herein provides for the generation of a volumetric image object within a clinically acceptable time period. The deformation model allows for the reconstruction of an imaged object accounting for movement. The deformation model allows for a more precise contouring of the target of interest, thereby allowing for a more precise radiation therapy treatment. Although this disclosure discusses the applicability of the invention to image guided radiation therapy, one skilled in the art should appreciate that the deformation model disclosed is equally applicable to other imaging procedures and modalities, especially those accounting for movement of a region of interest over a time interval.

The deformation model disclosed provides a method of reducing the number of vertices used in the deformation, thereby allowing reasonable processing time for clinical use. The reduction of vertices must be such as to allow for the reduction of processing time without creating a reduction in imaging accuracy. In this regard, the deformation model disclosed herein provides for reduction of vertices such that the selected vertices are distributed across the surface of the imaged object. The selected vertices represent all portions of the surface and are spaced far enough apart to substantially reduce topological violations caused by elastic point-based registration of closely positioned landmarks.

Figure 1:
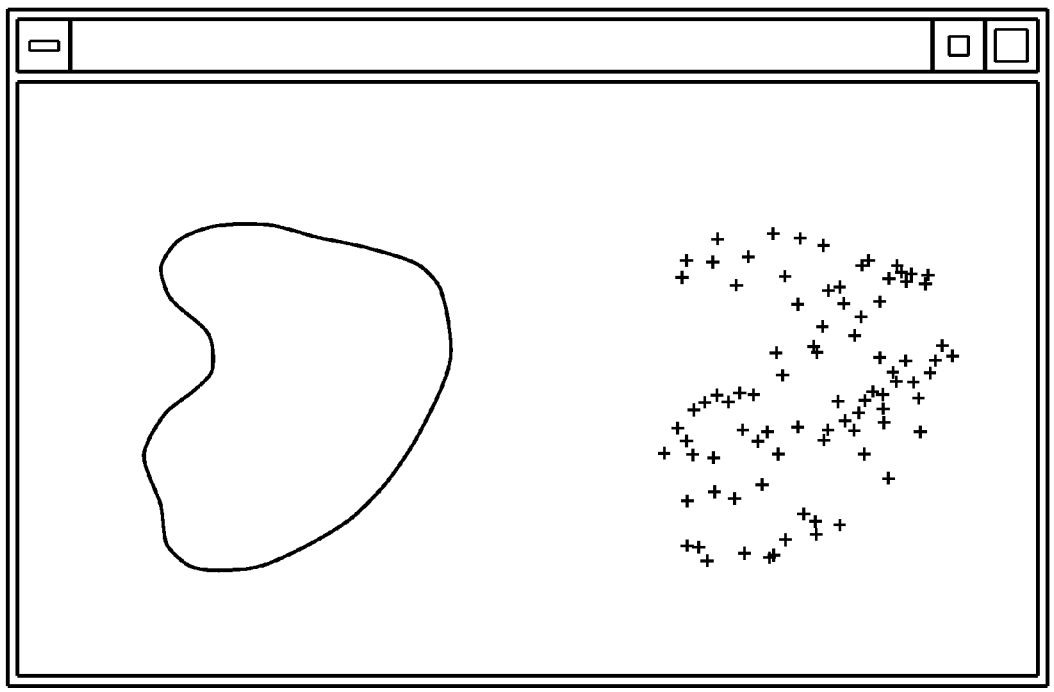
FIG. 1 illustrates a first imaged bladder as a triangular surface model with a vertex subset.
Figure 2:
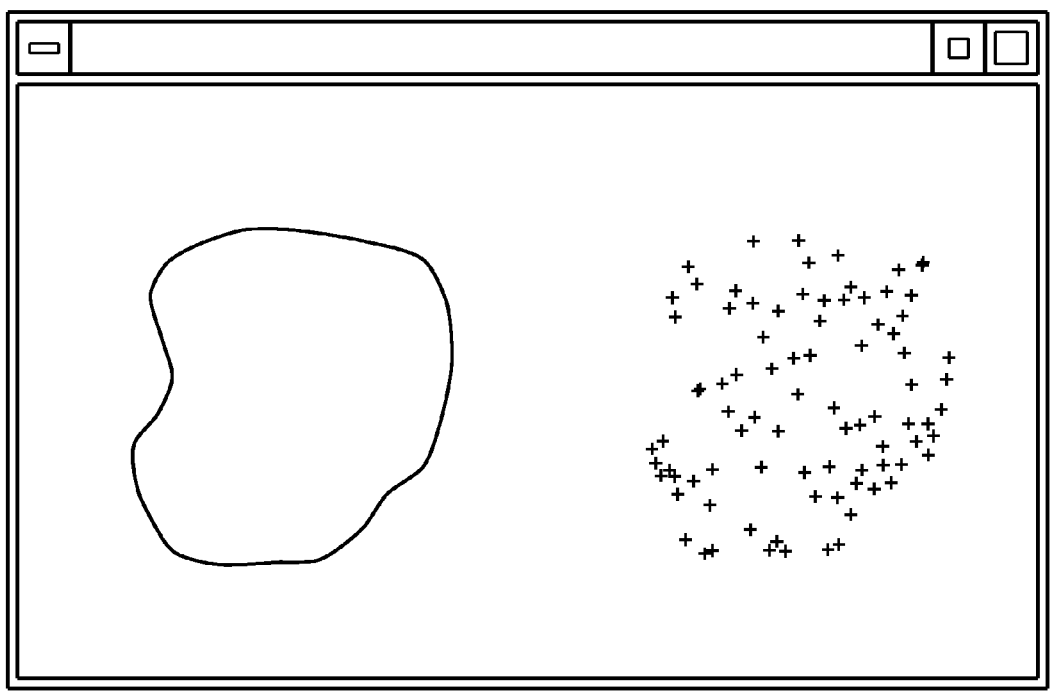
FIG. 2 illustrates a second imaged bladder as a triangular surface model with a vertex subset.
Figure 3:
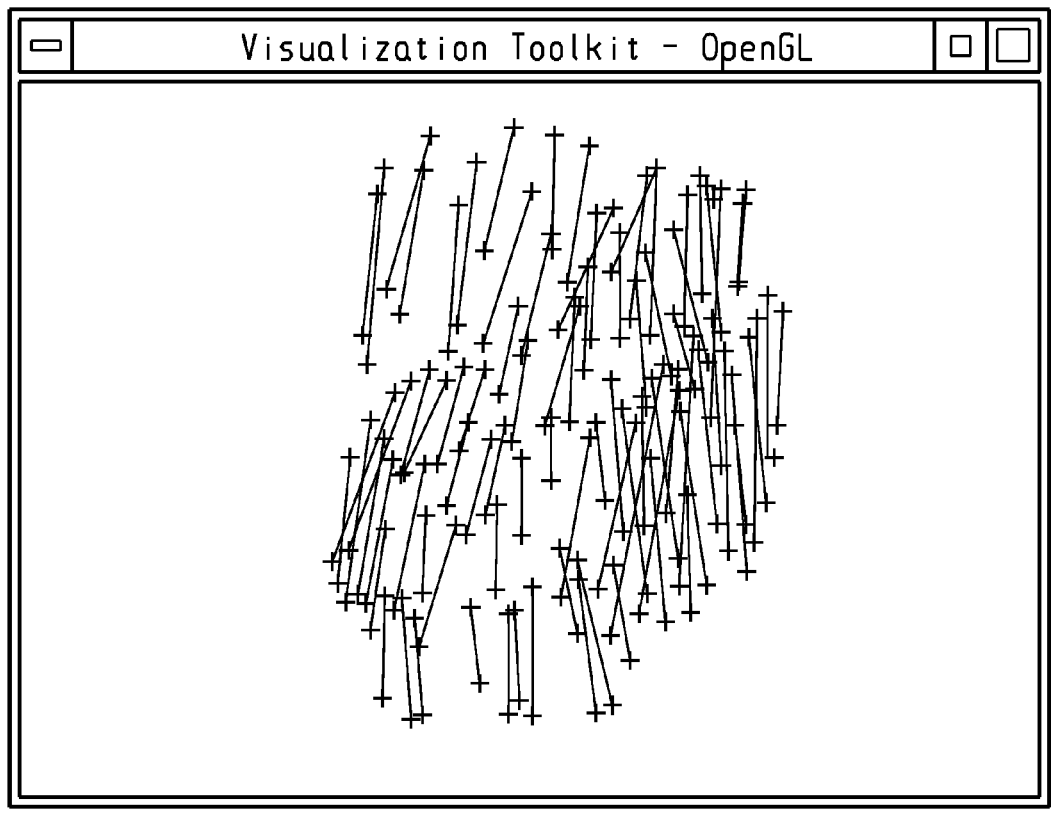
FIG. 3 illustrates the correspondence between the first and second imaged bladders based on the vertex subsets.
Figure 4:
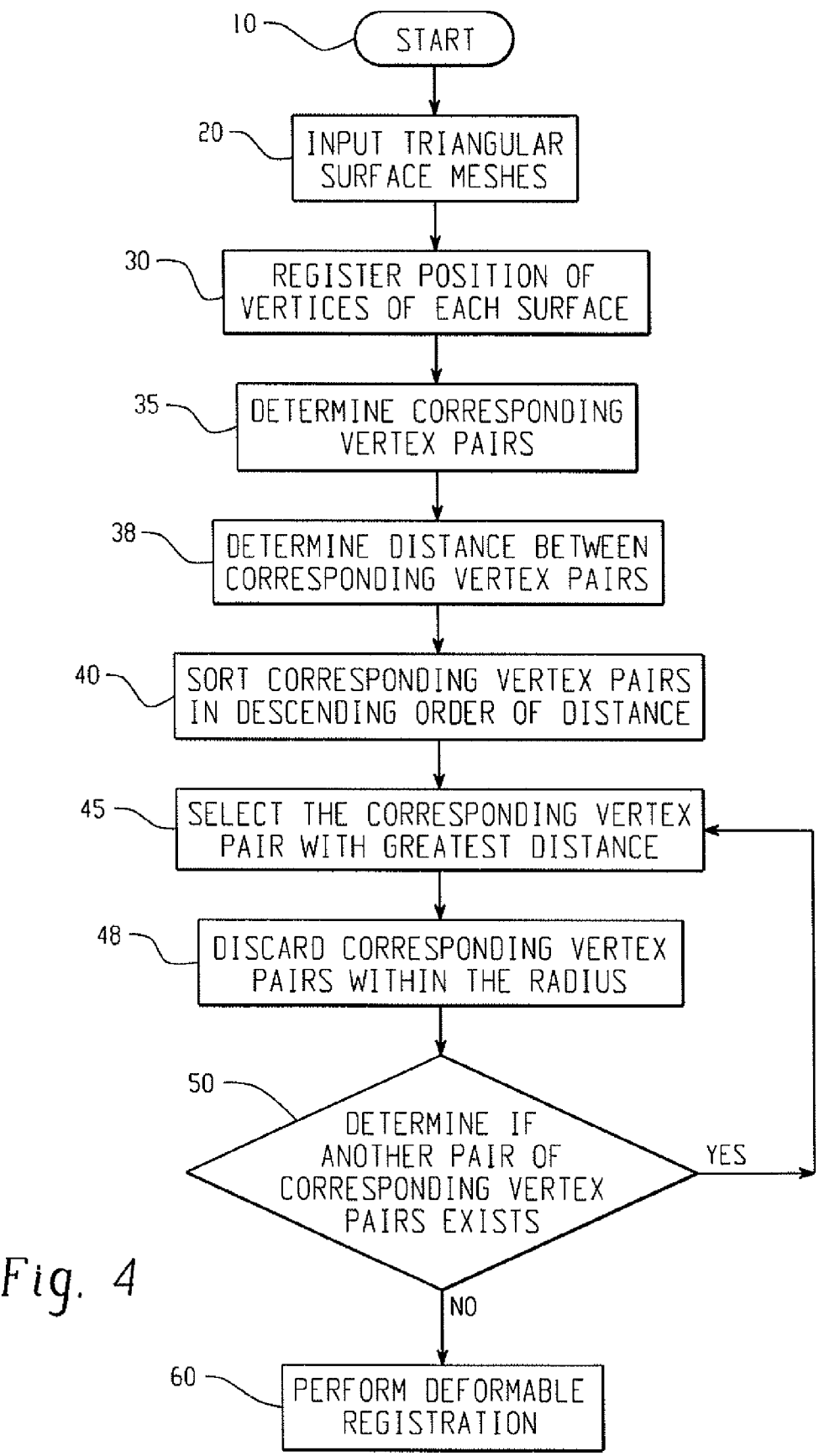
FIG. 4 illustrates an exemplary method flowchart for calculating volumetric deformation of imaged objects based on a selected subset of triangular mesh vertices of the objects.

In one embodiment of the present invention, the deformation model starts at 10 in FIG. 4. A pair of triangular surface meshes of corresponding objects, such as the bladders shown in FIGS. 1 and 2, are input at 20. The position of each of the vertices of the triangular surface meshes is recorded in a vertex index, shown at 30 in FIG. 4. It should be noted that although in many instances the objects do have the same number of vertices, the two objects need not have the same number of vertices in order for this method to be effective. At 35, each of the respective vertices of the two triangular surface meshes are matched to result in a set of corresponding vertex pairs. If the two meshes have identical topology, the corresponding vertex pairs are determined by the index of the vertex. Otherwise, the corresponding vertex can be determined e.g. being the closest in an Euclidean distance sense, or being the closest along the surface normal at the vertex position, or some other method.

Figure 5:
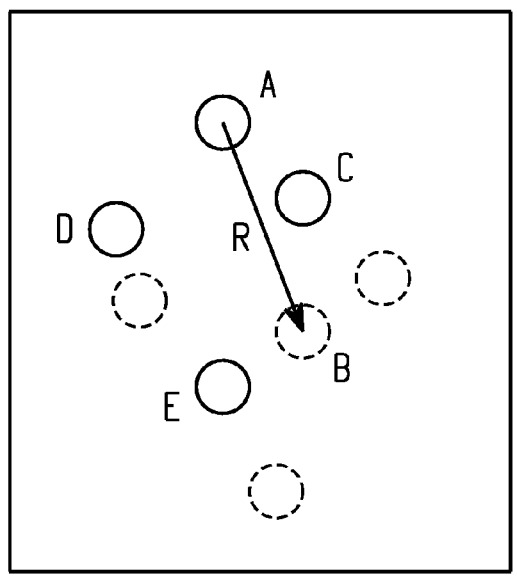
FIG. 5 illustrates an exemplary method of determining a selected subset of corresponding vertex pairs.

The Euclidean distance between each corresponding pair of vertices is calculated at 38 and then the distances sorted in descending order at 40. As such, the corresponding vertex pair with the greatest distance is given top priority. The corresponding vertex pair with the greatest distance is selected at 45. Any corresponding vertex pair that resides within the radius of the selected corresponding vertex pair is then discarded at 48. This can be best understood by considering FIG. 5, which represents an overlay of a few corresponding vertex pairs, wherein vertices from a first object in solid lines and vertices from a second object in dashed lines. If points A and B are determined to be the corresponding vertex pair with the greatest distance, a radius R, representing the distance between the selected corresponding vertex pair, is determined. By sweeping radius R around point A, it can be seen that points C and D lie within the radius R, while point E lies outside the radius R. Step 48 would discard points C and D, and their corresponding vertices from the second imaged object, from the corresponding vertex pair list. Discard points are not used in the deformable registration.

Once the corresponding vertex pairs that lie within the radius of the selected vertex pair are discarded, the method proceeds to 50 where it is determined whether or not any additional corresponding vertex pairs remain in the vertex pair list. If not, i.e. if all corresponding vertex pairs have been either selected or discarded, the method proceeds to 60 and the deformable registration is performed. If there are corresponding vertex pairs remaining in the corresponding vertex pair list, the method loops back to 45 and determines the next corresponding vertex pair with the greatest distance, which has not been either previously selected or discarded. The method then proceeds to 48 where corresponding points within the radius of the new selected corresponding vertex pair are discarded. This processes is repeated until all corresponding vertex pairs are either selected or discarded.

As a result of this process, the number of corresponding vertex pairs, which typically is in the thousands, is systematically reduced by a factor ranging approximately from 10 to approximately 100, or even more. For example, an anatomical object that has a few thousand corresponding vertex pairs may be reduced to 50 or 100 corresponding vertex pairs. The number of selected vertex pairs varies depending on a number of factors, including the size of the object and the amount of relative geometrical change between images. The reduced number of vertices allows for clinically acceptable processing time for deformable registration of an imaged object. The method also provides for selecting vertices that are spread out across the entire surface of the object. This ensures that all parts of the object are represented in the deformable registration and prevents use of proximate vertex pairs that may result in topographical errors.

In another embodiment of the deformable registration method, the corresponding vertex pairs that are discarded are not determined by the radius of the selected corresponding vertex pair, but instead based on a predetermined distance. In some embodiments, the predetermined distance can be varied by the clinician. In some embodiments, a step can be added that asks the clinician to enter a distance. The method then runs and a number of selected corresponding vertex pairs is determined. The method can then ask the clinician whether or not the number of selected corresponding pairs is within the desired range prior to performing the deformable registration. If the number of selected corresponding vertex pairs is not within the desired range, the clinician may alter the predetermined distance and allow the method to determine a new number of selected corresponding vertex pairs. Alternatively, the number of selected vertex pairs can have a threshold range. If the number of selected corresponding vertex pairs falls within the threshold range the deformable registration is performed. If the number of selected corresponding vertex pairs falls outside the threshold range, the predetermined distance is altered until the number of selected corresponding vertex pairs falls within the threshold range.

It should be appreciated by one skilled in the art that the methods described above can be implemented for performing deformable registration of a single object in an image or multiple objects in an image. If multiple objects are within the image, the vertices of all of the objects are combined into corresponding vertex clouds, one for each object. The method is then carried out for each corresponding vertex cloud. It should also be noted that the imaged objects do not need to have the same number of vertices. If the amount of vertices is not identical in the corresponding objects, the correspondence can be defined based on the object with the smaller number of vertices. The object with the larger number of vertices will have the extra vertices, i.e. those not resulting in a corresponding vertex pair, discarded.

The invention has been described with reference to one or more preferred embodiments. Clearly, modifications and alterations will occur to other upon a reading and understanding of this specification. It is intended to include all such modifications and alterations insofar as they come within the scope of the appended claims or equivalents thereof.

The invention claimed is:

1. A method of selecting vertices for performing deformable registration on imaged objects, the method comprising:
   acquiring a first object image and a second object image;
   determining the position of a plurality of vertices on the first object image and the second object image;
   determining a set of corresponding vertex pairs, each corresponding vertex pair comprising a vertex from the first object image and a vertex from the second object image;
   determining the distance between each corresponding vertex pair;
   sorting the set of corresponding vertex pairs based on the distance between each of the corresponding vertex pairs;

selecting the corresponding vertex pair with the greatest distance;

discarding corresponding vertex pairs that lie within a selected distance of the selected vertex pair;

repeating the selecting and discarding steps until all corresponding vertex pairs are either selected or discarded; and on a display device, displaying on a display at least one of the object images and the determined vertexes.

2. The method of claim 1, wherein said selected distance is the distance between the vertices of the selected vertex pair.

3. The method of claim 1, wherein said selected distance is a predetermined value.

4. The method of claim 1, wherein the selected distance can be varied.

5. The method of claim 1 further comprising:

determining a number of selected corresponding vertex pairs.

6. The method of claim 5 further comprising:

modifying the selected distance if the number of selected vertex pairs does not fall within a predetermined threshold range.

7. The method of claim 1, wherein a number of vertices in said first object image is not equal to a number of vertices in said second object image.

8. The method of claim 1, wherein each of said first and second object images are comprised of multiple anatomical objects.

9. The method of claim 1, wherein the plurality of vertices on said first and second object images are derived from triangular surface meshes.

10. An apparatus for selecting vertices for performing deformable registration on imaged objects, the apparatus comprising:

a computer device configured to:

determine the position of a plurality of vertices on a first and second imaged object;

determine a set of corresponding vertex pairs, each corresponding vertex pair comprising a vertex from the first imaged object and a vertex from the second imaged object;

sort the set of corresponding vertex pair based on the distance between each of the corresponding vertex pairs;

select the corresponding vertex pair with the greatest distance;

discard corresponding vertex pairs that lie within a selected distance of the selected vertex pair;

select the corresponding vertex pair with the next greatest distance and discard corresponding vertex pairs that lie within said selected distance of the new selected vertex pair;

repeat the selection and discarding of corresponding vertex pairs until all corresponding vertex pairs are either selected or discarded; and a display which displays the imaged objects.

11. The apparatus of claim 10, wherein said selected distance is the distance between the vertices of the selected vertex pair.

12. The apparatus of claim 10, wherein said selected distance is a predetermined value.

13. The apparatus of claim 10, wherein the selected distance can be varied.

14. The apparatus of claim 10, wherein the computer device is further configured to:

determine a number of selected corresponding vertex pairs.

15. The apparatus of claim 14, wherein the computer device is further configured to:

modify the selected distance if the number of selected vertex pairs does not fall within a predetermined threshold range.

16. The apparatus or claim 10, wherein a number of vertices in said first imaged object is not equal to a number of vertices in said second imaged object.

17. The apparatus of claim 10, wherein each of said first and second imaged objects are comprised of multiple anatomical objects.

18. The apparatus of claim 10, wherein the plurality of vertices on said first and second imaged objects are derived from triangular surface meshes.

19. A method of performing deformable registration on imaged objects in image guided radiotherapy, the method comprising:

with a computer:

determining the position of a plurality of vertices on first and second imaged objects;

determining a distance between corresponding vertex pairs, each corresponding vertex pair comprising a vertex from the first imaged object and a vertex from the second imaged objects;

sorting the set of corresponding vertex pairs based on the distance between each of the corresponding vertex pairs;

selecting the corresponding vertex pair with the greatest distance;

discarding corresponding vertex pairs that lie within a selected distance of the selected vertex pair;

repeating the selecting and discarding steps until all corresponding vertex pairs are either selected or discarded;

performing deformable registration on the first and second imaged objects using the selected corresponding vertex pairs; and displaying on a display the registered objects.

20. A non-transitory computer readable medium carrying software which controls one or more processors to perform the method of claim 19.

* * * * *